(12) United States Patent
Yuan

(10) Patent No.: US 11,470,934 B2
(45) Date of Patent: Oct. 18, 2022

(54) PORTABLE ELECTRONIC DEVICE CASE WITH THERMAL VENTS

(71) Applicant: TARGUS INTERNATIONAL LLC, Anaheim, CA (US)

(72) Inventor: Jonny Yuan, Placentia, CA (US)

(73) Assignee: TARGUS INTERNATIONAL LLC, Anaheim, CA (US)

(*) Notice: Subject to any disclaimer, the term of this patent is extended or adjusted under 35 U.S.C. 154(b) by 167 days.

(21) Appl. No.: 16/858,122

(22) Filed: Apr. 24, 2020

(65) Prior Publication Data

US 2020/0359758 A1    Nov. 19, 2020

Related U.S. Application Data

(60) Provisional application No. 62/848,444, filed on May 15, 2019.

(51) Int. Cl.
*A45C 11/00* (2006.01)
*A45F 5/00* (2006.01)

(52) U.S. Cl.
CPC ......... *A45C 11/00* (2013.01); *A45C 2011/002* (2013.01); *A45C 2011/003* (2013.01);
(Continued)

(58) Field of Classification Search
CPC ......... A45C 11/00; A45C 11/02; A45C 11/22; A45C 2011/001; A45C 2011/002; A45C 2011/003; A45C 2200/15; A45C 13/008; A45F 5/00; A45F 2200/0516; A45F 2200/0525; G06F 1/1656; H04B 1/3888; H04B 1/3894
See application file for complete search history.

(56) References Cited

U.S. PATENT DOCUMENTS 8,531,834 B2 * 9/2013 Rayner ................ H04B 1/3888
                                                              361/679.56
9,179,562 B2 * 11/2015 Rayner ................ G06F 1/1637
(Continued)

FOREIGN PATENT DOCUMENTS

CN        102638954 A    8/2012
CN        208339107 U    1/2019

OTHER PUBLICATIONS

PCT/US2020/030119, International Search Report and Written Opinion, dated Aug. 18, 2020, 9 pages.
(Continued)

*Primary Examiner* — Justin M Larson
(74) *Attorney, Agent, or Firm* — Stoel Rives LLP

(57) ABSTRACT

A case for a portable electronic device (PED) is disclosed. The case includes a body having an interior surface configured to accept a PED and an exterior surface to be exposed to outside forces. A back vent that permits the transfer heat away from the PED and to the environment presents through the body of the case. A cushioning member is placed at or near the back vent on the interior surface of the case and may substantially or completely surround the back vent. When a PED is placed within the case, the fit of the PED and the case causes the cushioning member to press against the PED in order to create a cushion for the PED in the event of an outside force being applied to the case. The case may include a screen protector within a frame that attaches to the body.

19 Claims, 11 Drawing Sheets

(52) U.S. Cl.
CPC ..... *A45C 2200/15* (2013.01); *A45F 2005/008* (2013.01); *A45F 2200/0516* (2013.01); *A45F 2200/0525* (2013.01)

(56) References Cited

U.S. PATENT DOCUMENTS

| | | | |
|---|---|---|---|
| 9,565,910 B2* | 2/2017 | Magness | A45C 13/008 |
| 9,635,918 B2* | 5/2017 | Kay | G06F 1/1656 |
| 9,717,314 B2* | 8/2017 | Idehara | G06F 1/166 |
| 9,726,919 B2* | 8/2017 | Priest | G06F 1/1626 |
| 9,768,822 B1 | 9/2017 | Loh et al. | |
| 10,005,611 B2* | 6/2018 | Rayner | G06F 1/1656 |
| 10,044,396 B2* | 8/2018 | Richardson | A45C 13/36 |
| 10,103,769 B2* | 10/2018 | Witter | A45F 5/00 |
| 10,165,839 B2* | 1/2019 | Richardson | H05K 5/023 |
| 10,206,470 B2* | 2/2019 | Fathollahi | A45C 11/00 |
| 10,340,970 B2* | 7/2019 | Richardson | A45C 5/00 |
| 10,420,406 B2* | 9/2019 | Lipner | H04R 1/44 |
| 10,615,837 B1* | 4/2020 | Amato | H04M 1/0202 |
| 10,716,377 B2* | 7/2020 | Rayner | A45C 13/008 |
| 11,119,544 B1* | 9/2021 | Perez | G06F 1/203 |
| 2013/0027849 A1* | 1/2013 | Berumen | A45C 11/22 |
| | | | 361/679.01 |
| 2013/0140312 A1* | 6/2013 | Lane | G06F 1/1628 |
| | | | 220/315 |
| 2013/0193149 A1* | 8/2013 | Balourdet | G06F 1/182 |
| | | | 220/560.01 |
| 2015/0014214 A1* | 1/2015 | Richardson | H04B 1/3888 |
| | | | 206/591 |
| 2015/0201723 A1* | 7/2015 | Rayner | F16M 11/2021 |
| | | | 224/191 |
| 2016/0011627 A1* | 1/2016 | Lin | A45C 11/00 |
| | | | 361/679.09 |
| 2016/0198823 A1* | 7/2016 | Bergreen | H04M 1/185 |
| | | | 224/241 |
| 2017/0235348 A1* | 8/2017 | Wolf | G06F 1/203 |
| | | | 361/679.46 |
| 2018/0046229 A1* | 2/2018 | Balourdet | G06F 1/1656 |
| 2018/0335805 A1* | 11/2018 | Charlesworth | G06F 1/1626 |
| 2019/0029383 A1 | 1/2019 | Lopez | |
| 2019/0104645 A1 | 4/2019 | Paseman et al. | |
| 2020/0044676 A1* | 2/2020 | Flores | G06F 1/1626 |
| 2020/0069015 A1* | 3/2020 | Poon | A45C 13/008 |
| 2020/0359758 A1* | 11/2020 | Yuan | G06F 1/1628 |
| 2021/0137232 A1* | 5/2021 | Gandhi | A45C 13/02 |
| 2021/0145139 A1* | 5/2021 | Armstrong | A45C 11/00 |

OTHER PUBLICATIONS

PCT/US2020/030119, International Preliminary Report on Patentability, Nov. 25, 2021, 6 pages.

* cited by examiner

PORTABLE ELECTRONIC DEVICE CASE WITH THERMAL VENTS

RELATED APPLICATIONS

This application claims priority to U.S. Provisional Patent Application No. 62/848,444 filed on May 15, 2019 and which is incorporated herein by reference in its entirety.

TECHNICAL FIELD

This disclosure generally relates to the field of cases for portable electronic devices (PEDs). More specifically, this disclosure relates to the field of PED cases with sealing back vent features.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION OF PREFERRED EMBODIMENTS

Figure 1A:
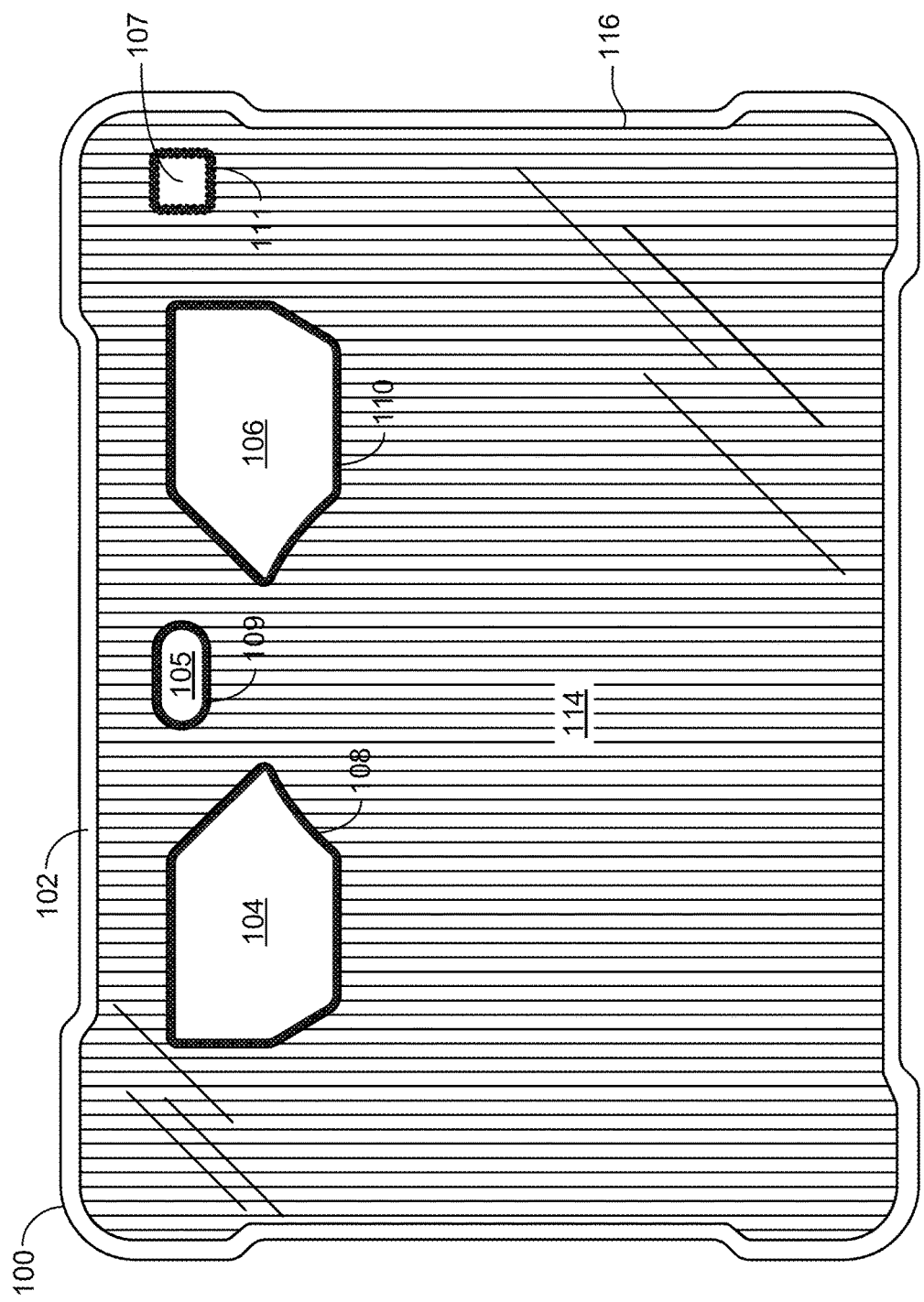
FIG. 1A illustrates a front of a PED case, according to one embodiment.

Modern PEDs are ubiquitous due to the benefits derived from carrying the computational and/or signal processing power provided by the PED on or with the person. A PED may include a tablet, smartphone, e-readers, and the like. However, the use of a PED in this fashion implies multiple considerations. One of these considerations is the protection of the PED. It may be desirable to place the PED in a case for protection from external forces and/or other environmental hazards. Due to the portable nature of the PED, it may be desirable to place the PED in a case because the PED may be subject to certain stresses due to its portability (such as drops, casual handling, casual placement, etc.). A PED case can help protect the PED by taking the brunt of the force from these types of events. It may also be desirable to place the PED in a case because the environment around the PED (including, but not limited to, the temperature, humidity, and surrounding objects or environmental substances such as liquids, dirt, and/or dust) may be dynamic and unpredictable, with some such environments (or substances from those environments) having the potential to damage the PED.

Another consideration accompanying the use of the PED is heat dissipation. Due to a desire for the PED to remain fully functional apart from a physical connection with any other device, a PED typically integrates all components (electronic or otherwise) that it needs in order to perform its processing and user interaction tasks. These may include components that generate a non-trivial amount of heat when in use, such as power source(s) (typically one or more batteries), processors (e.g., a system on a chip (SoC), a central processing unit (CPU), a graphics processing unit (GPU)), and/or power converters, among other possibilities. In order to prevent damage to these or other components of the PED and/or to prevent or minimize any necessary throttling of the performance (and thus heat output) of these or other components of the PED, it is usually necessary to provide for the dissipation of generated heat away from the PED.

A third consideration accompanying the use of the PED is peripheral access. A PED may have peripherals such as buttons, speakers, cameras, microphone, etc., that may not function well (or at all) unless they remain uncovered by another material. For example, a camera peripheral of the PED that is covered by opaque rubber of a traditional case will not be able to capture images as intended by the manufacturer.

The protection consideration on the one hand and the heat dissipation and peripheral access considerations on the other hand are in many cases contrary to one another. For example, in many instances, the protection of the PED in a traditional case may have an adverse effect on the heat dissipation from the PED, if (as is often the case) the material of the case acts to some extent as a heat insulator. Further, a traditional case that covers a peripheral (e.g., a camera, button, microphone, or speaker) of the PED may degrade or impede the functionality of that peripheral. However, using the PED without a case may raise the risk of damage to the PED due to careless/rough handling and/or other external forces and hazards. The present disclosure describes PED cases that are effective at dissipating heat in a passive manner, providing access to peripherals, and providing protection to the PED from careless/rough handling and/or external forces and hazards.

Figure 1B:
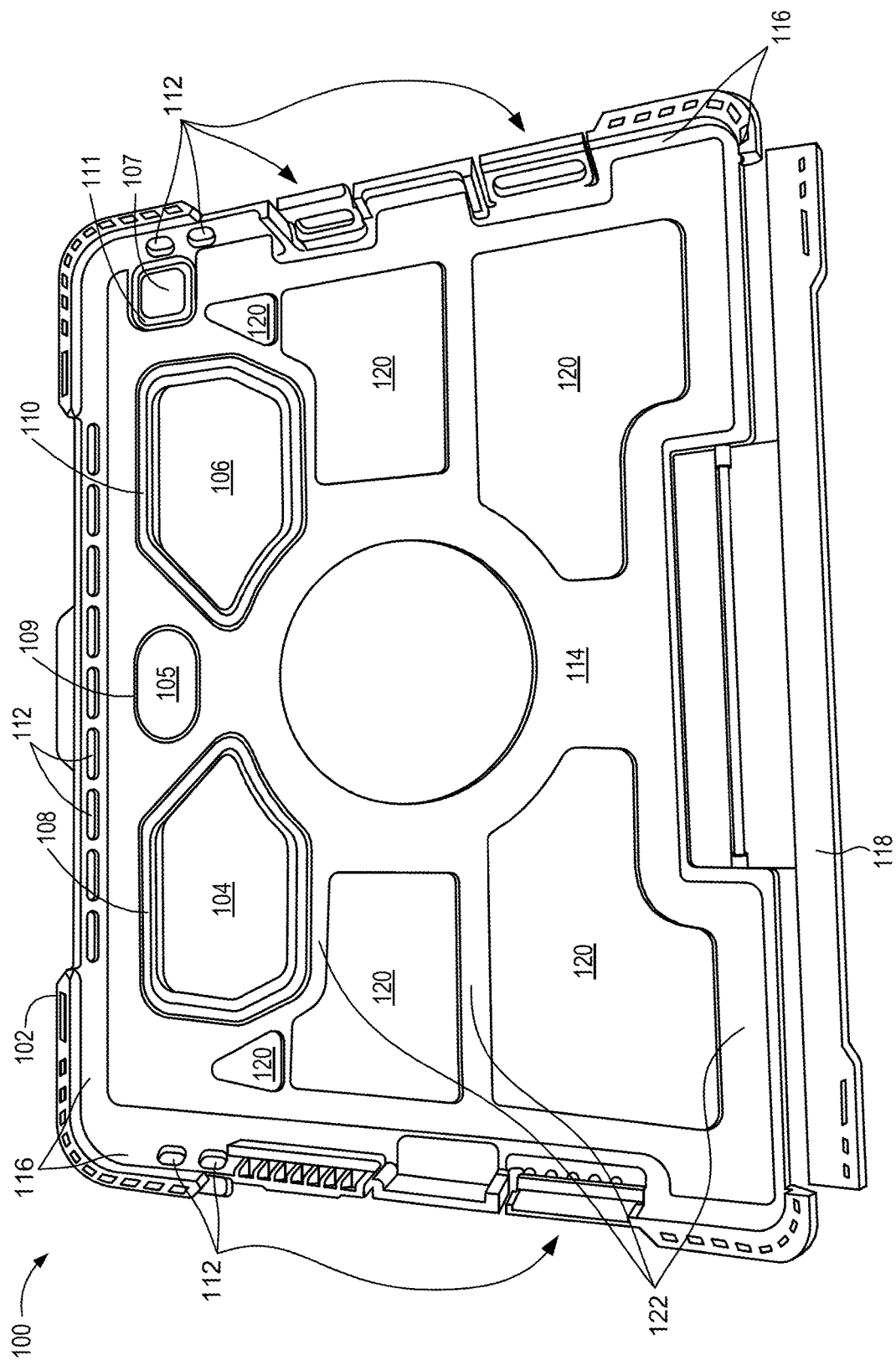
FIG. 1B illustrates an alternative embodiment of a front of a PED case.

FIGS. 1A and 1B illustrate different embodiments of a front or interior of a PED case 100. The PED case 100 includes a body 102, back vents 104, 105, 106, 107 and sealing members 108, 109, 110, 111. The body 102 comprises one or more interior surfaces (including an interior backplane 114 and interior edges such as an interior edge 116) that are shaped and/or otherwise configured to accept a PED as an installed PED to the PED case 100. The body 102 of the PED case 100 may be made of plastic, rubber, thermoplastic polyurethane (TPU), or another appropriate material.

The back vents 104, 105, 106, 107 may present through the interior backplane 114. In some embodiments, the portion(s) of the PED that are exposed through the back vents 104, 105, 106, 107 may not be sensitive to potentially harmful environmental substances (e.g., liquids, dirt, and/or dust), or such portion(s) may be otherwise hardened against environmental substances.

The back vents 104, 106 may expose an area of a PED that has been placed in the PED case 100 to open air. This may allow for heat transfer from a portion of a PED installed in the PED case 100 directly to the surrounding environment.

The back vents 104, 106 may be shaped and positioned such that they are optimally used for heat transfer purposes with a predetermined PED. For example, the back vents 104, 106 may be placed such that, when a known model of PED is placed within the PED case 100, one or more components of the PED that are known to generate a relatively greater amount of heat are substantially aligned with one of the back vents 104, 106. For example, it may be that when the known PED that is a tablet computer is placed within the PED case 100, the battery of the tablet computer is substantially in line with the back vent 104 and the CPU of the tablet computer is substantially in line with the back vent 106. Thus, these components (which may generate a relatively greater share of the heat within the tablet computer) can quickly dissipate heat through the back vents 104, 106 without such heat transfer being slowed by heat passage through the material of the body 102 of the PED case 100 first. In some embodiments, a heat outtake (either active or passive) of the PED (not shown) may align with one or more of the back vents 104, 106.

The vents 104, 106 may be configured in different shapes, sizes, and number to improve thermal venting and/or for aesthetics. As illustrated, the vents 104, 106 may be symmetrically aligned on the backplane 114 such that they are equadistant from a center axis.

The back vents 105, 107 may expose peripherals of an installed PED (e.g., a camera and/or a microphone) to the outside environment, allowing for the necessary peripheral access. For example, this placement may allow a camera to take photos and/or video and the microphone to be used without interference from the PED case 100. Thus, the vents 105, 107 may also be referenced herein as peripheral apertures as the primary purpose is to allow access to peripheral devices. The back vents 105, 107 may also allow for heat transfer from the portion of an installed PED against which they are placed.

Sealing members 108, 109, 110, 111 may be attached substantially around the perimeter of corresponding vents 104, 105, 106, 107. The sealing members 108, 109, 110, 111 prevent the entry of potentially harmful environmental substances into the PED case 100 (due to their placement directly against the back of the PED when the PED is installed) at the locations of the back vents 104, 105, 106, 107. The sealing members 108, 109, 110, 111 may also be referred to as cushioning members 108, 109, 110, 111 in that they cushion and/or support the PED near the areas exposed through the vents 104, 105, 106, 107 and thus help to keep an installed PED in position within the PED case 100. Thus, the sealing or cushioning members 108, 109, 110, 111 may be formed of a compressible material.

The sealing/cushioning members 108, 109, 110, 111 may be installed at, near, and/or around the edges of the back vents 104, 105, 106, 107 where the back vents 104, 105, 106, 107 present through the interior backplane 114 (or other interior surface) of the body 102, and they may completely or substantially surround the back vents 104, 105, 106, 107. Other placements and shapes of back vents with associated cushioning members are contemplated. Further, one of skill in the art will appreciate that any number of vents and corresponding sealing members may be disposed the backside of the case. Thus, 2, 3, 4, or more vents may be used as needed.

The sealing/cushioning members 108, 109, 110, 111 may help cushion the areas of an installed PED that are near the vents 104, 105, 106, 107, and may reduce or eliminate the stresses that those areas might otherwise be placed under due to events related to the portability of the PED, such as drops, casual handling, casual placement, etc.

When uncompressed, it may be that the sealing/cushioning members 108, 109, 110, 111 rise above the interior backplane 114 of the body 102 of the PED case 100. When a PED is inserted into the PED case 100, the interior backplane 114 (and/or other interior surface with a cushioning member) may be pressed towards the PED due to the fit of the PED case 100 around the PED. The pressure thus formed may cause the sealing/cushioning members 108, 109, 110, 111 to be pressed against the PED. The sealing/cushioning members 108, 109, 110, 111 may be made of a material different than the body 102, such as rubber, TPU, ethylene-vinyl acetate (EVA) foam, or any other material sufficient to act as the sealing/cushioning members 108, 109, 110, 111 as herein described.

The material(s) of the sealing/cushioning members 108, 109, 110, 111 may be the same as, or different from, the material(s) of the body 102 of the PED case 100. The material(s) of the added sealing/cushioning members 108, 109, 110, 111 may be chosen based on one or more of multiple attributes, such as elasticity, durability, compressibility, softness, force absorption, a quality of "seal" created when pressed against a typical surface found on a PED, cost, and/or availability, among other considerations.

It is also contemplated that, in some cases, the sealing/cushioning members 108, 109, 110, 111 are physically integrated into the body 102 of the PED case 100. For example, a mold for the body 102 of the PED case 100 that is made of material appropriate to act as a sealing/cushioning member 108, 109, 110, 111 (e.g., a rubber case) may simply be shaped to include the sealing/cushioning members 108, 109, 110, 111.

In some embodiments, the PED case 100 may further include various side vents 112 in the interior edge 116. The side vents 112 may present through the interior edge 116 of the body 102 of the PED case 100. The side vents 112 may allow the heat transfer away from an exposed portion of a PED installed in the PED case 100 and to the environment. The placement of these side vents 112 may align with, e.g., a dedicated heat outtake (either active or passive) of an installed PED (not shown). Note that in the embodiment of FIG. 1B, the side vents 112 represent only some, but not all, of the side vents present in that embodiment.

The PED case 100 may further include one or more cushioning areas 120 attached to the body 102 of the PED case 100. When a PED is installed in the PED case 100, these cushioning areas 120 may abut against the PED. These cushioning areas 120 may act to prevent areas of an installed PED that are at or near the cushioning areas 120 from experiencing the stresses those areas might otherwise be placed under due to the portability of the installed PED, such as drops, casual handling, casual placement, etc. These cushioning areas 120 may be made of EVA foam, rubber, TPU, or any other material sufficient to act as a cushioning area 120 as herein described.

It is also contemplated that, in some cases, the cushioning areas 120 are physically integrated into the body 102 of the PED case 100. For example, a mold for the body 102 of the PED case 100 that is made of material appropriate to act as a cushioning areas 120 (e.g., a rubber case) may simply be shaped to include the cushioning areas 120.

The elements placed on the interior backplane 114 of the PED case 100, such as the cushioning areas 120 and/or the sealing/cushioning members 108, 109, 110, 111, may be spaced and placed such that there are airflow paths 122 in between the such elements. The airflow paths 122 may facilitate the movement of air across the interior backplane 114 of the PED case 100 and eventually out to one or more of the side vents 112. This movement may act to carry heat away from an installed PED, further helping the system to dissipate heat to prevent damage to and/or throttling of an installed PED. The airflow through the airflow paths 122 may be passive, or it may be an active airflow caused by, e.g., an airflow device of an installed PED (not shown). Note that in the embodiment of FIG. 1B, the airflow paths 122 represent only some, but not all, of the airflow paths present in that embodiment.

The PED case 100 may further include one or more detachable interfaces 118. The detachable interface 118 may optionally be positioned to cover a portion of a PED installed in the PED case 100 (and/or a frame of a screen protector as described below). In some embodiments, the detachable interface 118 may be pulled away or otherwise detached (via, e.g., sliding, lifting, etc.) from the rest of the body 102 of the PED case 100 in order to expose a portion of a PED that has been installed in the PED case 100. The detachable interface 118 (or another detachable interface of the PED case 100) may be positioned to allow access to a port of an installed PED, such as a keyboard port, a USB port, or a power port.

Figure 2:
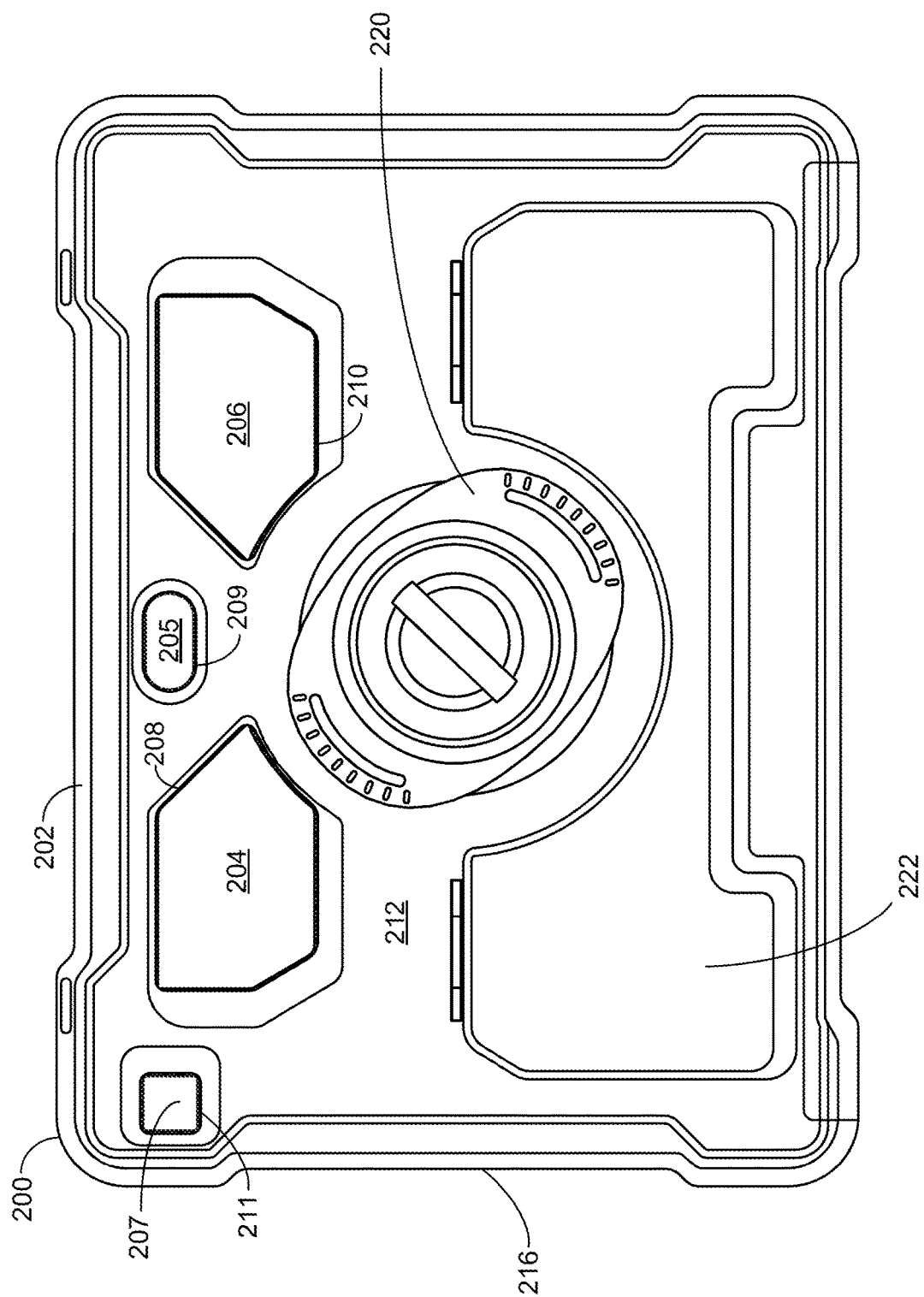
FIG. 2 illustrates a back of a PED case, according to one embodiment.

FIG. 2 illustrates a back of a PED case 200, according to one embodiment. The PED case 200 includes a body 202 with back vents 204, 205, 206, 207, and sealing/cushioning members 208, 209, 210, 211. The body 202 comprises an exterior surface (which includes an exterior backplane 212 and exterior edges such as an exterior edge 216) that is exposed to the environment during normal use. The back vents 204, 205, 206, 207 may present through the exterior backplane 212. As illustrated, the exterior surfaces of the PED case 200 may also host other features. In the embodiment of FIG. 2, the sealing/cushioning members 208, 209, 210, 211 have been placed at the back vents 204, 205, 206, 207 on the interior backplane of the PED case 200 (as in FIGS. 1A and 1B) and do not extend through the back vents 204, 205, 206, 207. This placement may help keep the sealing/cushioning members 208, 209, 210, 211 from being physically impacted by, e.g., surfaces or substances that interact directly with the exterior surface of the PED case 200 but do not reach through the back vents 204, 205, 206, 207.

The PED case 200 may further include a handgrip 220 on the exterior backplane 212. The handgrip 220 may be disposed in the proximate center of the backplane 212 and enables a one-handed grip of the case 200. The handgrip 220 may be rotatable to facilitage hand engagement as desired. The PED case 200 may further include a pivotable stand 222 that pivots from a closed position to an open or support position. In the open position, the pivotable stand 222 supports the case in angled orientation relative to a horizontal surface.

Figure 3A:
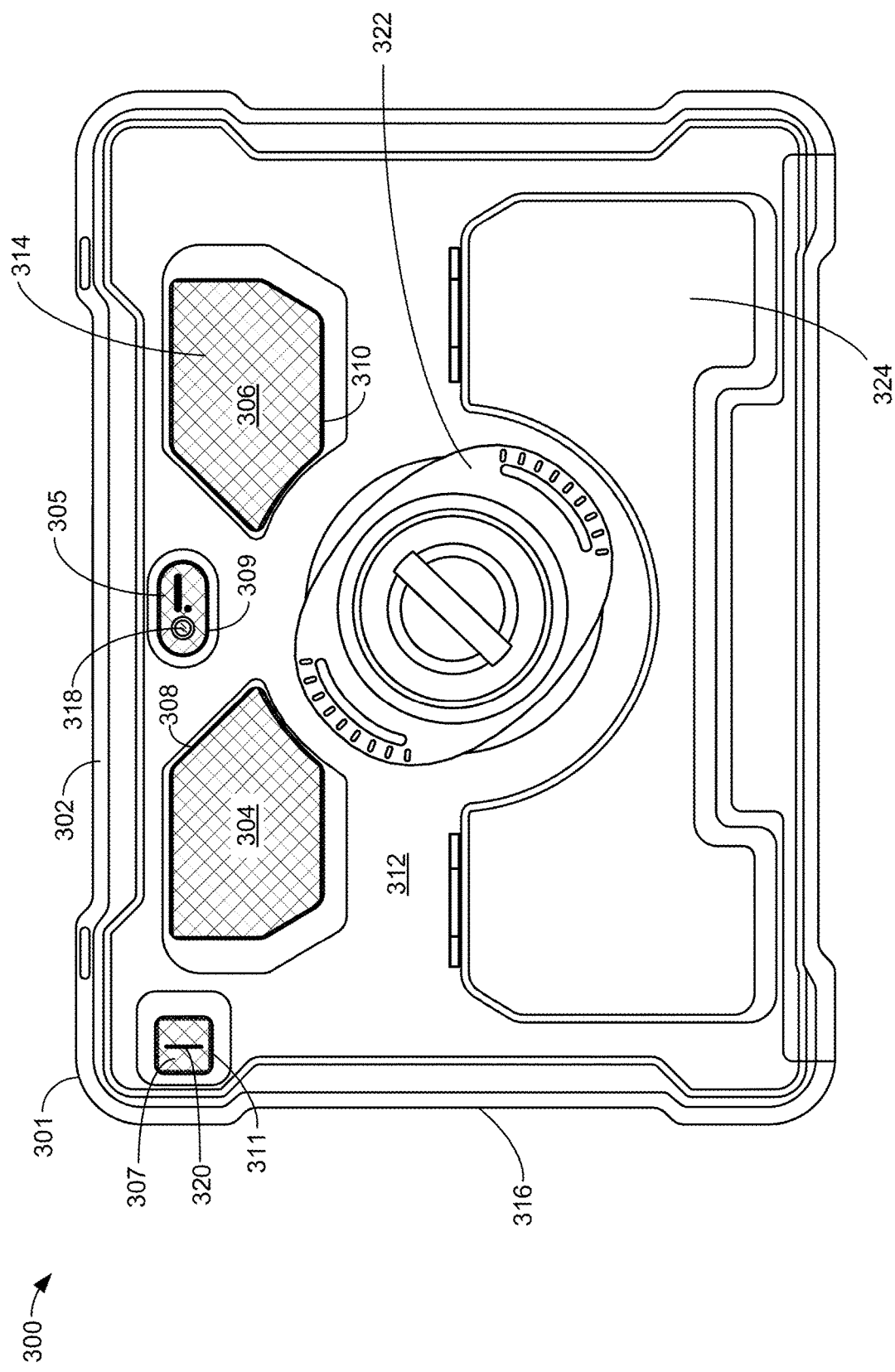
FIGS. 3A-3B illustrate a PED case with an installed tablet computer, according to one embodiment.

FIG. 3A illustrates a PED case 300 with an installed tablet computer 314, according to one embodiment. The PED case 300 includes a body 302 with back vents 304, 305, 306, 307 and sealing/cushioning members 308, 309, 310, 311. The body 302 comprises an exterior surface which includes an exterior backplane 312 and exterior edges such as an exterior edge 316) that is exposed to the environment during normal use. The back vents 304, 305, 306, 307 may present through the exterior backplane 312. The exterior surfaces of the PED case 300 may also host other features. In the embodiment of FIG. 3A, the tablet computer 314 has been installed into the PED case 300. The fit of the PED case 300 and the tablet computer 314 causes the sealing/cushioning members 308, 309, 310, 311, which have been installed on the interior backplane of the PED case 300 as in FIGS. 1A and 1B, to be pressed up against the back of the tablet computer 314. This allows the sealing/cushioning members 308, 309, 310, 311 to perform their cushioning functions as described above. The contact may also have the effect of keeping/helping to keep potentially harmful environmental substances (e.g., dirt, dust, and/or liquid) from entering the PED case 300 through the back vents 304, 305, 306, 307. As described above, the PED case 300 may be configured such that portions of the tablet computer 314 that are sensitive to these dangerous substances are not exposed through the back vents 304, 305, 306, 307. As seen, the embodiment of FIG. 3A aligns the back vent 305 with a camera 318 and further aligns the back vent 307 with a microphone 320 so that each peripheral is fully functional while the tablet computer 314 is installed in the PED case 300. FIG. 3A further illustrates a handgrip 322 and a support stand 324 similar to those disclosed in FIG. 2.

Figure 3B:
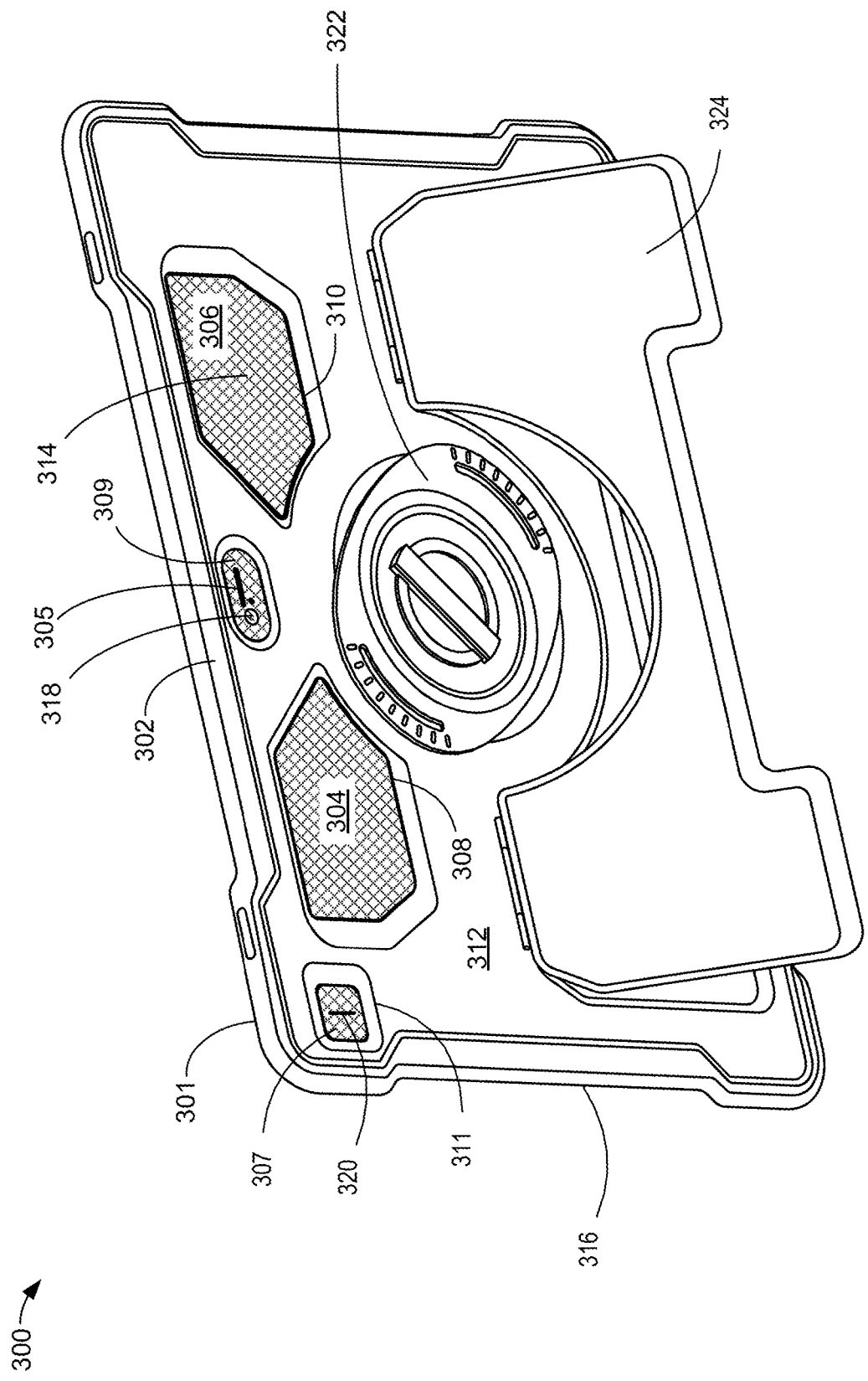

FIG. 3B illustrates a perspective view of a PED case 300 in a viewing position. The stand 324 is pivoted to an open position to support the PED case 300 at an angle relative to a horizontal surface.

Figure 4:
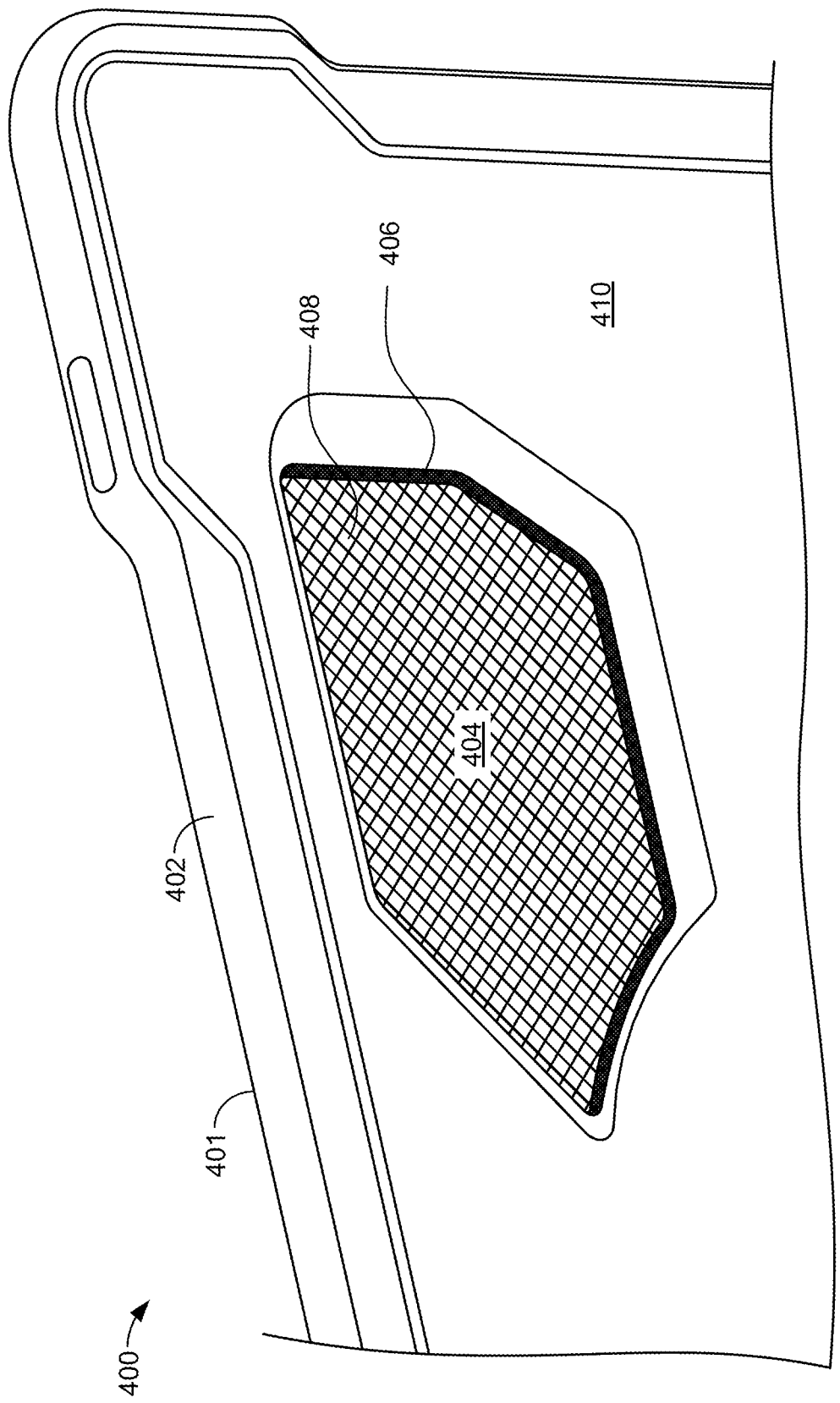
FIG. 4 illustrates a perspective view of a portion of a PED case with an installed PED, according to one embodiment.

FIG. 4 illustrates a perspective view of a portion of a PED case 400 with an installed PED 408, according to one embodiment. The PED case 400 includes a body 402 with a back vent 404 and a sealing/cushioning member 406 installed on the interior backplane of the PED case 400. The body 402 comprises an exterior surface (which includes an exterior backplane 410) that is exposed to the environment during normal use. The back vent 404 may present through the exterior backplane 410. The embodiment of FIG. 4 shows the sealing/cushioning member 406 pressed up against the PED 408 (which may be a tablet computer, a smartphone, or another PED). With the PED 408 installed into the PED case 400, there is no gap between the PED 408 and the sealing/cushioning member 406 and the sealing/cushioning member 406 can act as a cushion as described above. The illustrated contact between the PED 408 and the sealing/cushioning member 406 may also help to keep potentially harmful environmental substances from entering the PED case 400.

Figure 5:
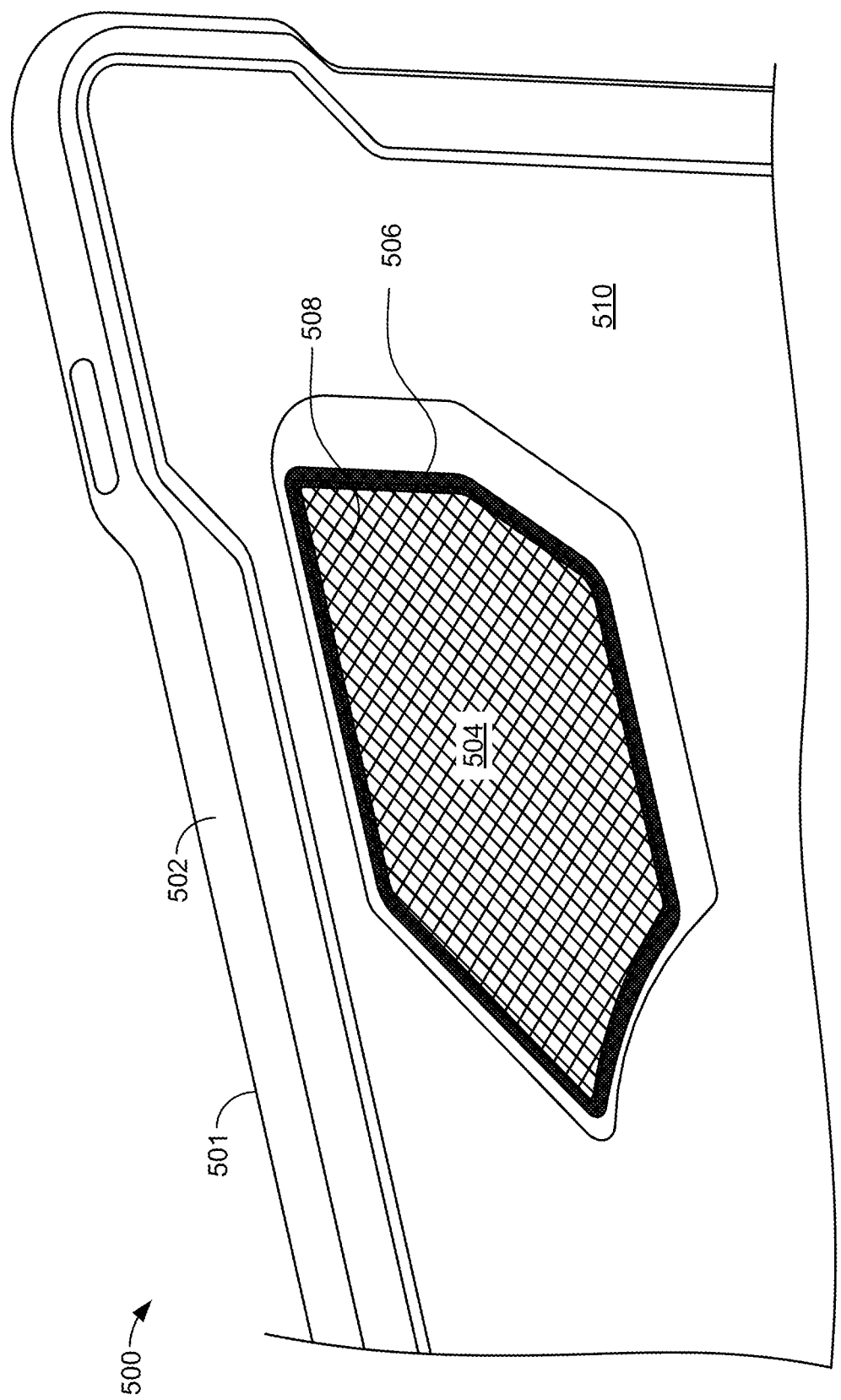
FIG. 5 illustrates a perspective view of a cushioning member installed around the edge of a back vent of a body of a PED case, according to one embodiment.

FIG. 5 illustrates a perspective view of a sealing/cushioning member 504 installed around the edge of a back vent 506 of a body 502 of a PED case 500, according to one embodiment. The material and placement method of the sealing/cushioning member 504 may be according to any of the embodiments disclosed herein. The sealing/cushioning member 504 may be shaped to include a raised portion 508. As in other embodiments described herein, the fit of the body 502 of the PED case 500 around an installed PED may cause pressure between the sealing/cushioning member 504 and the installed PED. In the embodiment of FIG. 5, the narrower width of the raised portion 508 of the sealing/cushioning member 504 relative to the rest of the sealing/cushioning member 504 may act to focus the pressure between the sealing/cushioning member 504 and an installed PED over the relatively smaller surface area of the raised portion 508. The shape of the raised portion 508 relative to the rest of the sealing/cushioning member 504 may help direct the force from drops, casual handling, casual placement, etc., into the sealing/cushioning member 504 in a pre-determined, controlled way. The use of the raised portion 508 relative to the rest of the sealing/cushioning member 504 may also create a tighter seal than could otherwise be made by a sealing/cushioning member 504 that lacks the raised portion 508, as the force between the body 502 of the PED case 500 and an installed PED would be concentrated over the relatively smaller surface area of the raised portion 508.

Figure 6:
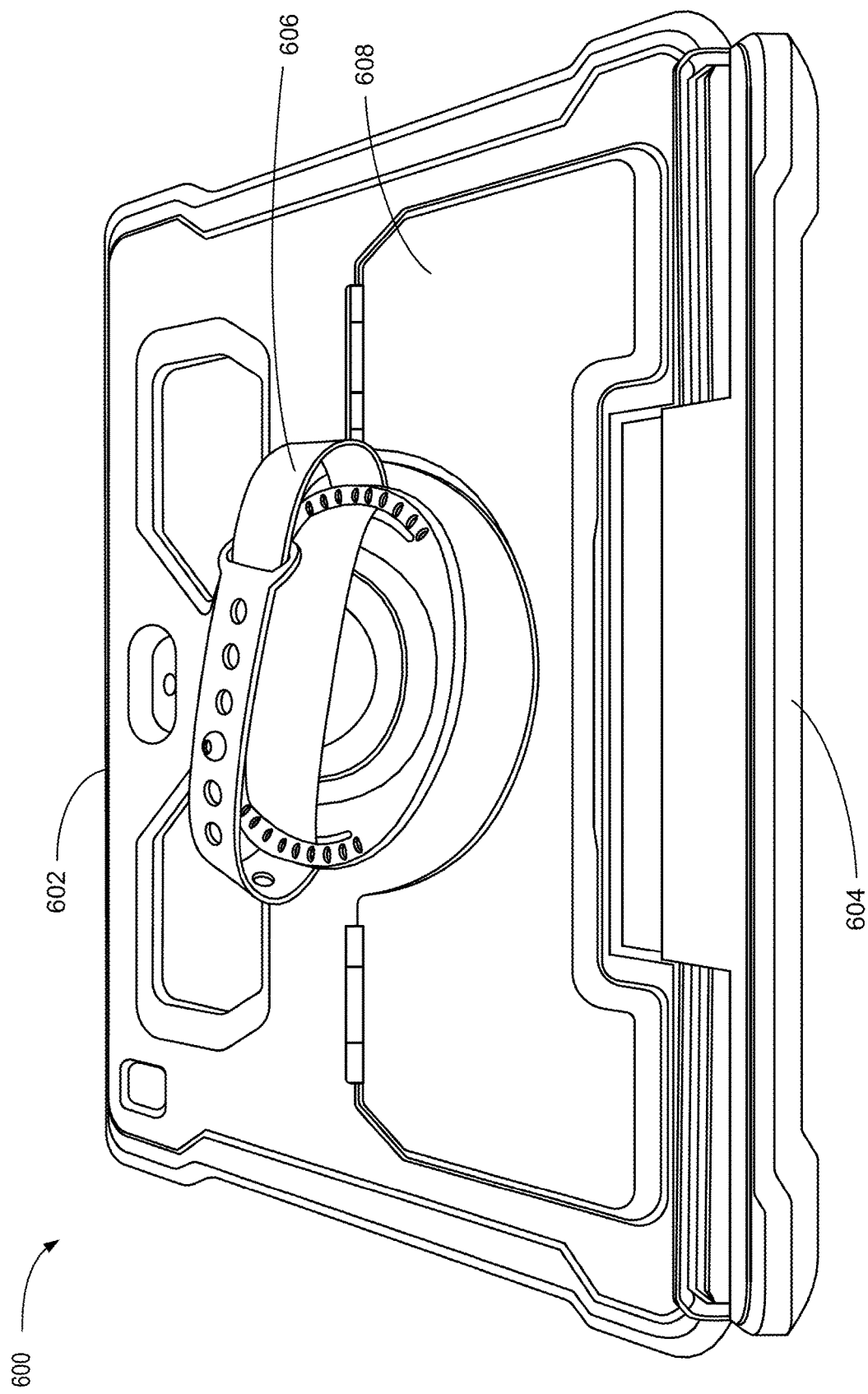
FIG. 6 illustrates a perspective view of the back of a PED case with an extended detachable interface, according to one embodiment.

FIG. 6 illustrates a perspective view of the back of a PED case 600 with a detached detachable interface 604, according to one embodiment. In the embodiment of FIG. 6, the detachable interface 604 is detached by pulling the detachable interface 604 away from the bottom of a body 602 of the PED case 600. The detachable interface 604 may then be swung backward and away from the front of the PED case 600 on one or more hinges. This may allow access to a port that is located on a PED that has been installed in the body 602 of the PED case 600 (e.g., a port for a detachable keyboard associated with the installed PED). Other types of detachable interfaces (e.g., sliding, lifting, clipping) associated with other types of ports (e.g., power, USB, video, stereo) of an installed PED are contemplated.

FIG. 6 further illustrates a rotatable handgrip 606 and a pivotable support stand 608 similar to those disclosed in FIGS. 2, 3A, and 3B.

Figure 7:
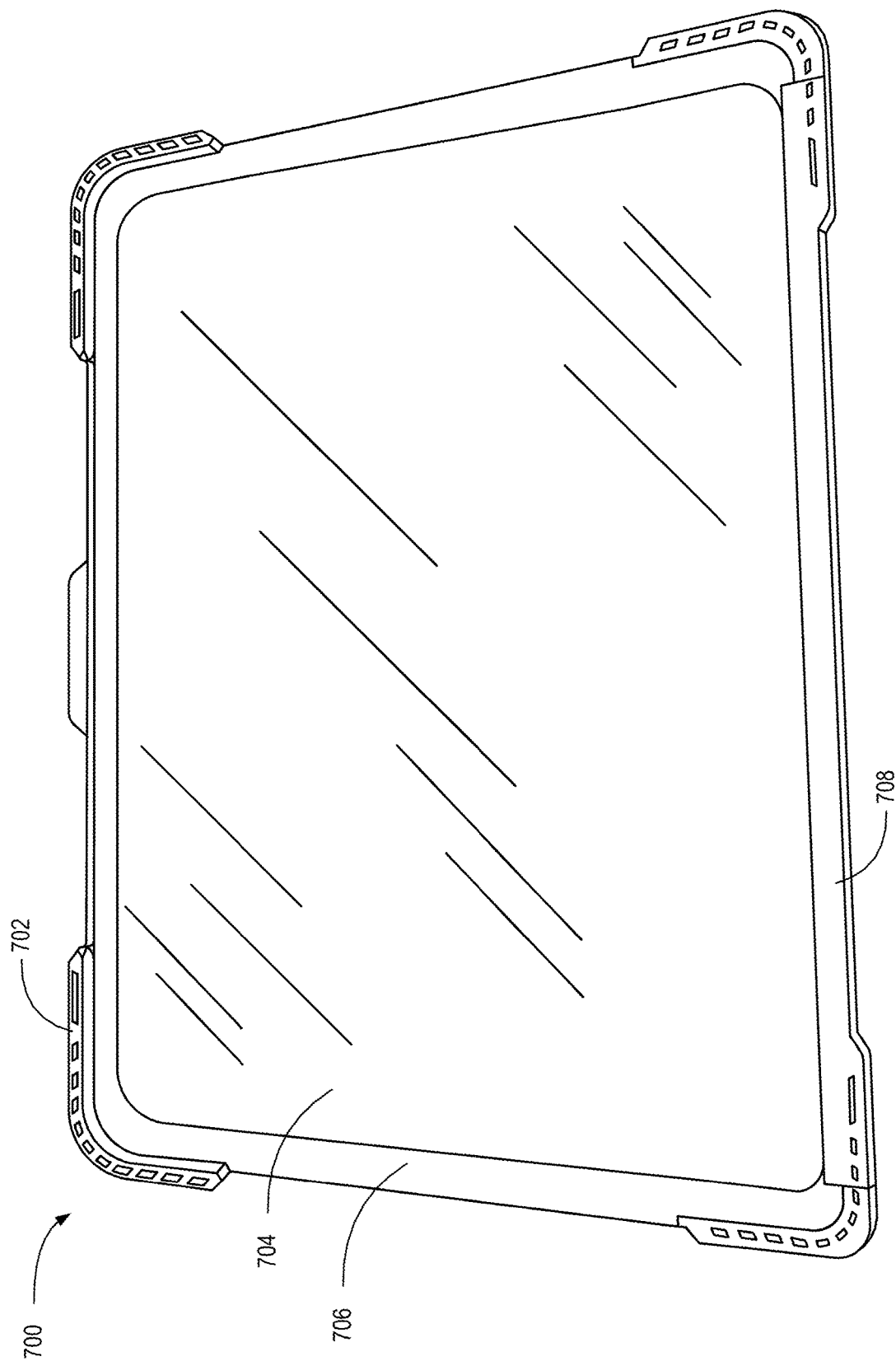
FIG. 7 illustrates a PED case including a body and a screen protector in a frame that has been attached to the body, according to one embodiment.

FIG. 7 illustrates a PED case 700 including a body 702 and a screen protector 704 in a frame 706 that has been attached to the body 702, according to one embodiment.

The frame 706 of the screen protector 704 may attach to the body 702 of the PED case 700 in such a way that the screen protector 704 is placed over a screen of a PED (not shown) that has been installed in the PED case 700. In some embodiments, the frame 706 may snap over features of the body 702 in order to be held in place. Physical connection with the body 702 in ways other than through the combinations that are sufficient to hold the frame 706 in place relative to the body 702 is contemplated.

In cases where the screen of the installed PED is a touch screen, the screen protector 704 may be placed to allow for the transfer of resistive touches, capacitive touches, or other touches to the screen of the PED. The screen protector 704 may be made of plastic, tempered glass, or another appropriate material to protect the screen of the PED. The body 702, the screen protector 704, and the frame 706 may each act to help keep environmental substances away from a PED that is placed within the PED case 700.

In some cases, a detachable interface 708 may interact with the frame 706 of the PED case 700. In the illustrated embodiment, the detachable interface 708 is meant to allow access for a detachable keyboard to an installed PED through the PED case 700. When the detachable keyboard is not being used, the detachable interface 708 may be slid into a closed position, where it interacts with the frame 706 by partially sliding over the frame 706. This interaction may help keep the frame 706 and/or the detachable interface 708 in place.

Figure 8:
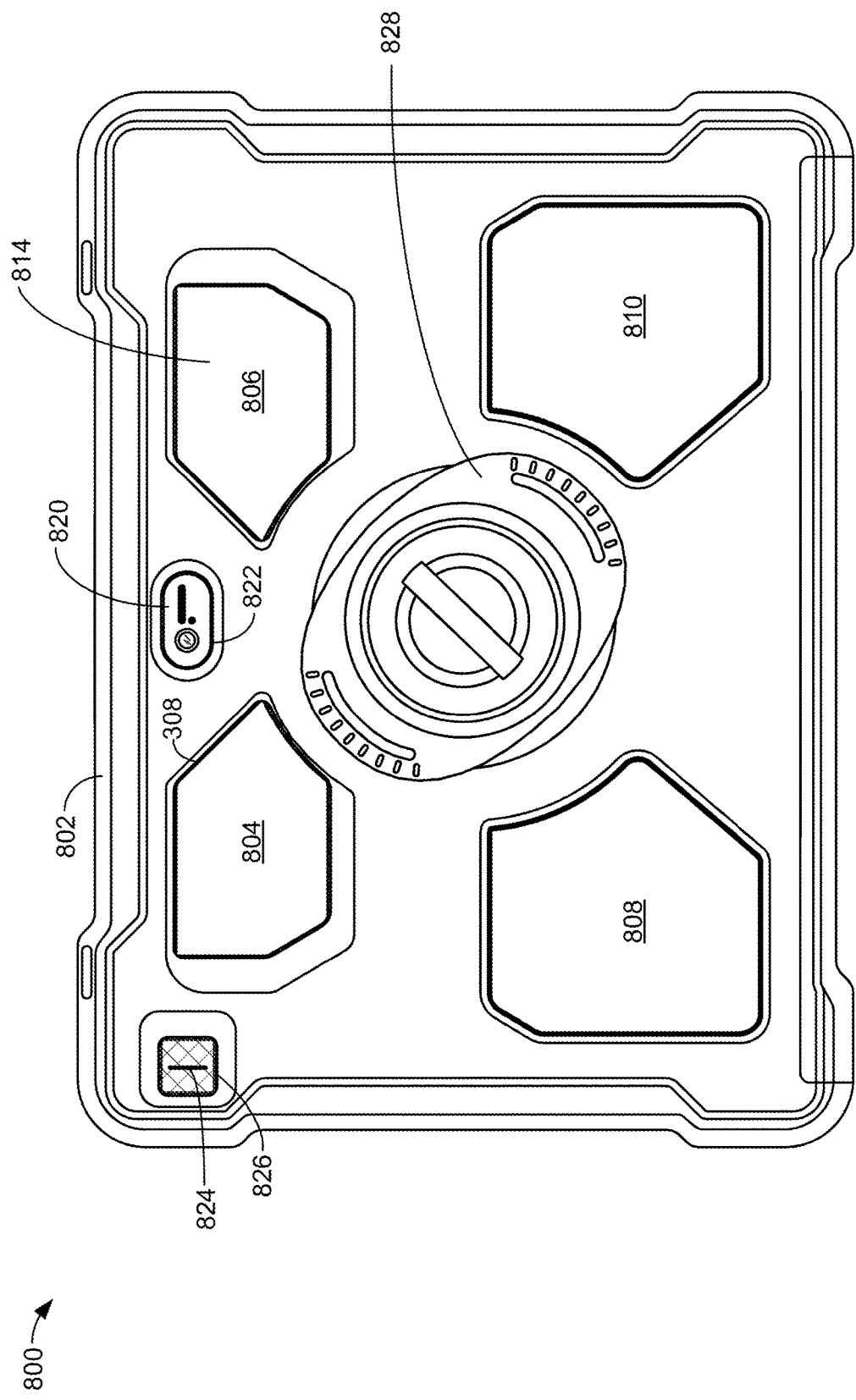
FIG. 8 illustrates an alternative embodiment of a PED case.

FIG. 8 illustrates an alternative embodiment of a backside of a PED case 800. The PED case 800 primarily differs from the embodiments of FIGS. 2, 3A, and 3B in that the case 800 includes two additional back vents 808, 810 and the case 800 does not include a support stand. Thus, embodied the case 800 has back vents 804, 806, 808, 810, and corresponding sealing/cushioning members 812, 814, 816, 818. The case 800 may also include peripheral apertures 820, 824 with corresponding sealing/cushioning members 822, 826. The case 200 may further include a handgrip 828 which may be rotatable to facilitage hand engagement as desired.

Figure 9:
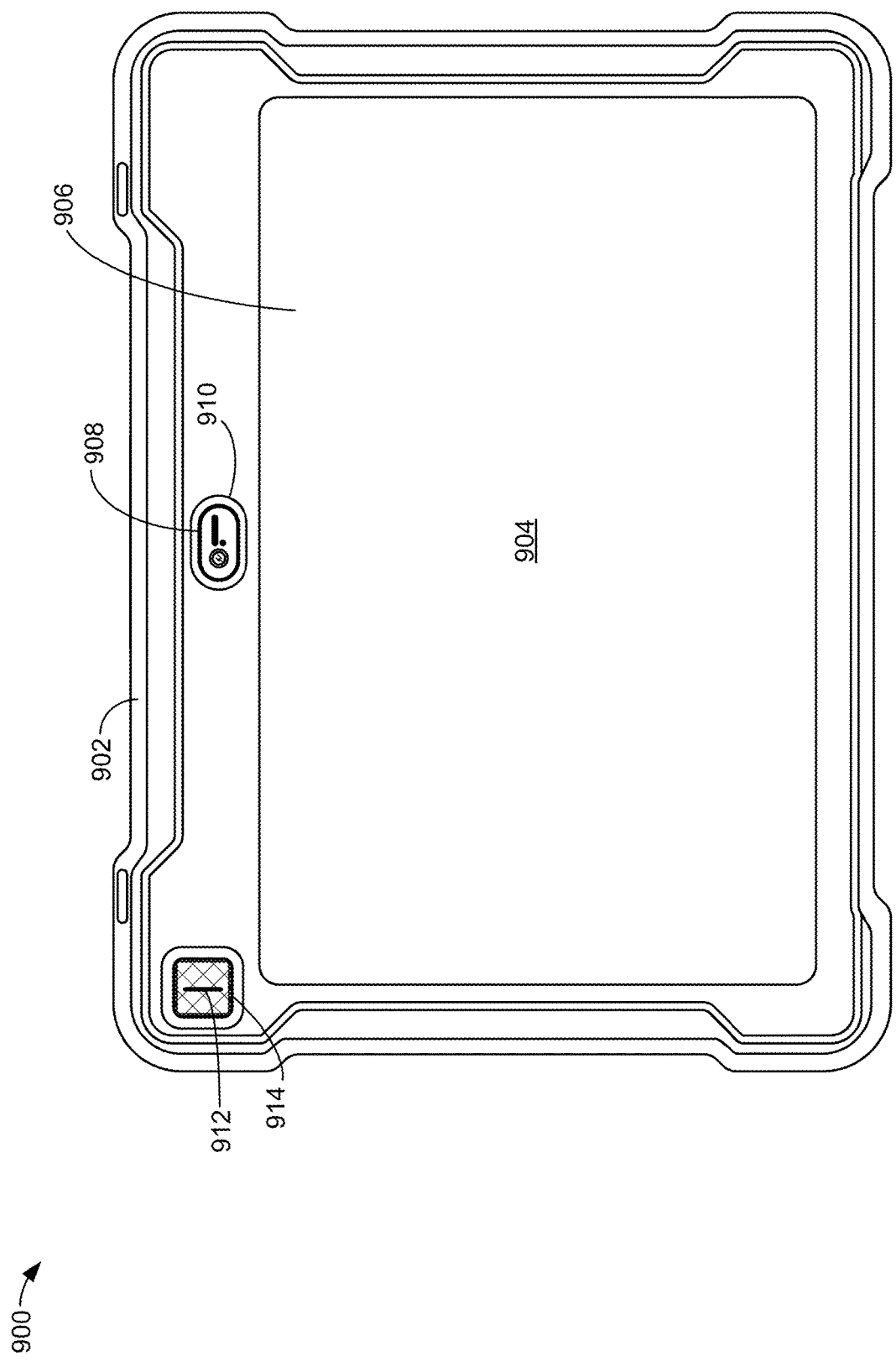
FIG. 9 illustrates an alternative embodiment of a PED case.

FIG. 9 illustrates an alternative embodiment of a backside of a PED case 900. The PED case 900 primarily differs from previous embodiments in that it has fewer vents. The case 900 includes a single thermal, back vent 904 which may be disposed proximate to the center of the backside. The vent 904 may be configured in different shapes and sizes to improve thermal venting or for aesthetics. In one embodiment, the vent 904 may take most of the surface area of the back surface of the case 900. A corresponding sealing/cushioning member 906 is disposed along the perimeter of the vent 904 in a manner similar to that discussed previously. The case 900 may further include peripheral apertures 908, 912 and corresponding sealing/cushioning members.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, required, or essential feature or element. The scope of the present invention should, therefore, be determined by the following claims.

The invention claimed is:

1. A portable electronic device and case assembly, comprising:
   a portable electronic device, including a backside, sides, and a display side;
   a case, removable from the portable electronic device, including:
      an interior surface and side surfaces configured to receive and retain the portable electronic device such that the interior surface contacts the backside of the portable electronic device, the side surfaces contact the sides of the portable electronic device, and the side surfaces define an opening for the display side of the portable electronic device such that the display side is exposed and accessible by a user;
      a back surface;
      a vent extending from the interior surface to the back surface, wherein the vent is aligned with a portion of the backside of the portable electronic device that is:
      hardened against environmental substances to prevent entry of environmental substances into the portable electronic device,
      devoid of a heat outtake, and
      devoid of a peripheral; and
      a cushioning member extending substantially around the perimeter of the vent, the cushioning member including a compressible material different from the interior surface to press against a received portable electronic device to provide a seal against environment substances.

2. The portable electronic device and case assembly of claim 1, wherein the cushioning member extends partially around the interior surface and the back surface.

3. The portable electronic device and case assembly of claim 1, wherein the vent is aligned with a heat-generating component of the portable electronic device.

4. The portable electronic device and case assembly of claim 1, further comprising a framed screen protector to align with a display of the portable electronic device.

5. The portable electronic device and case assembly of claim 1, wherein the cushioning member provides a seal against external substances when pressed against the received portable electronic device.

6. The portable electronic device and case assembly of claim 1, further comprising:
 a peripheral vent extending from the interior surface through the back surface,
 the peripheral vent aligning with a peripheral device of the portable electronic device; and
 a peripheral cushioning member extending substantially around the peripheral vent, the peripheral cushioning member including a compressible material different from the interior surface and press against a received portable electronic device.

7. The portable electronic device and case assembly of claim 1, further comprising:
 a second vent; and
 a second cushioning member extending substantially around the perimeter of the second vent, the cushioning member including a compressible material different from the interior surface and press against a received portable electronic device.

8. The portable electronic device and case assembly of claim 1, further comprising a hand grip attached to the back surface and configured to enable one-handed retention of the case.

9. The portable electronic device and case assembly of claim 1, further comprising a pivotable support stand configured to pivot from a closed position to an open position, wherein in the open position the support stand supports the case in an angled orientation.

10. The portable electronic device and case assembly of claim 1, wherein the interior surface includes an air flow path.

11. The portable electronic device and case assembly of claim 1, wherein the cushioning member includes a raised surface extending away from the back surface.

12. A portable electronic device and case assembly, comprising:
 a portable electronic device;
 a case, removable from the portable electronic device, including:
 an interior surface and side surfaces configured to receive and retain the portable electronic device such that the interior surface contacts a backside of the portable electronic device, the side surfaces contact the sides of the portable electronic device, and the side surfaces define an opening for a display side of the portable electronic device such that the display side is exposed and accessible by a user;
 a back surface; and
 first and second vents extending from the interior surface to the back surface, wherein the first and second vents are aligned with portions of a backside of the portable electronic device that are:
 hardened against environmental substances to prevent entry of environmental substances into the portable electronic device,
 devoid of a heat outtake, and
 devoid of a peripheral; and
 first and second cushioning members extending substantially around the corresponding perimeters of the corresponding first and second vents and partially over the interior surface and the back surface, wherein the first and second cushioning members include a compressible material to provide a seal against external substances when pressed against a received portable electronic device to provide a seal against environment substances.

13. The portable electronic device and case assembly of claim 12, further comprising a framed screen protector to align with a display of the portable electronic device.

14. The portable electronic device and case assembly of claim 12, further comprising:
 a peripheral vent extending from the interior surface through the back surface,
 the peripheral vent aligning with a peripheral device of the portable electronic device; and
 a peripheral cushioning member extending substantially around the peripheral vent, the peripheral cushioning member including a compressible material and press against a received portable electronic device to provide a seal against external substances.

15. The portable electronic device and case assembly of claim 12, further comprising a hand grip attached to the back surface and configured to enable one-handed retention of the case.

16. The portable electronic device and case assembly of claim 12, further comprising a pivotable support stand configured to pivot from a closed position to an open position, wherein in the open position the support stand supports the case in an angled orientation.

17. The portable electronic device and case assembly of claim 12, wherein the first and second cushioning members each include a raised surface extending away from the back surface.

18. The portable electronic device and case assembly of claim 12, wherein a side surface includes a side vent.

19. The portable electronic device and case assembly of claim 18, wherein the interior surface includes an airflow path in communication with the side vent.

* * * * *